United States Patent Office 3,067,454
Patented Dec. 11, 1962

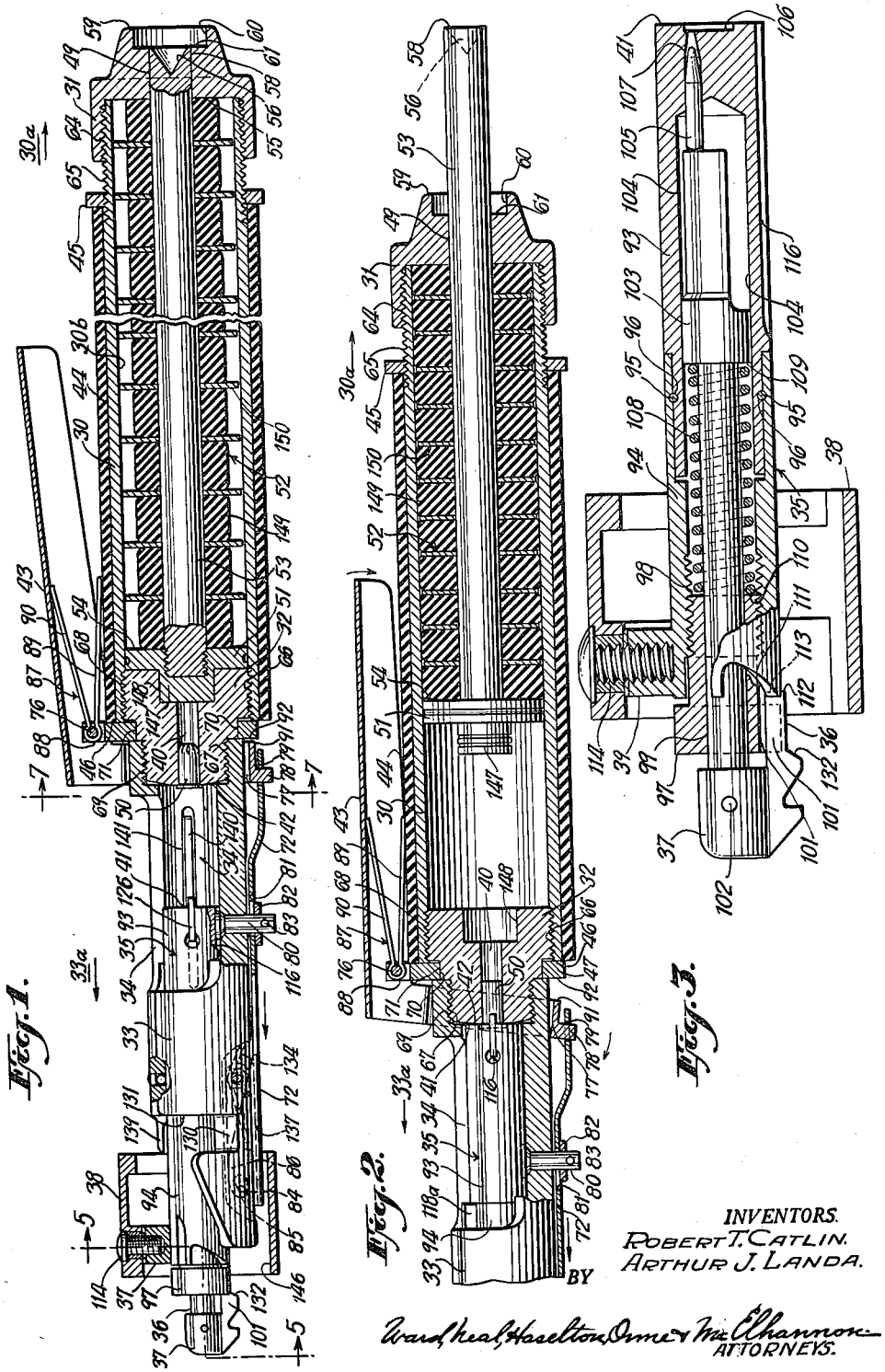

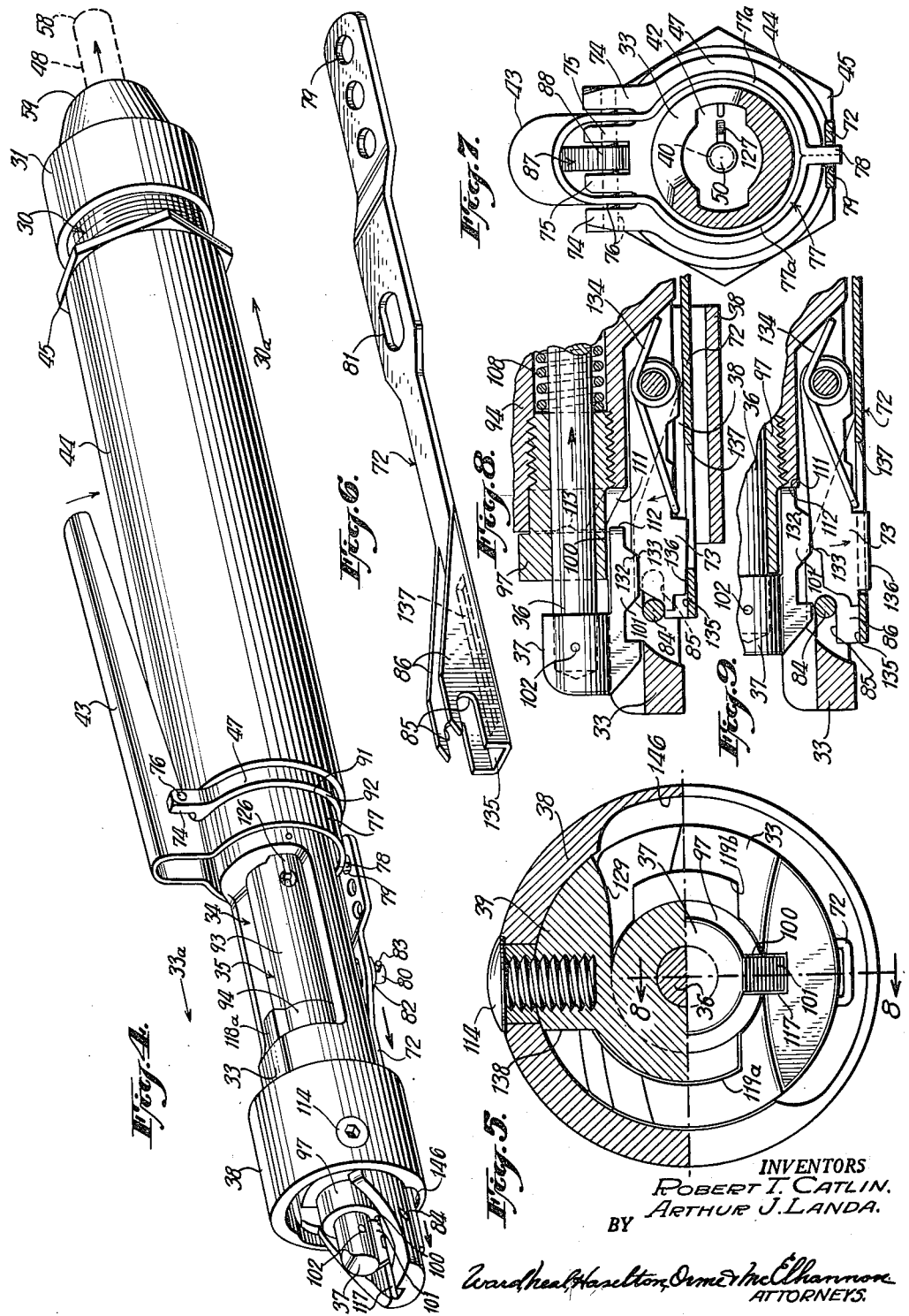

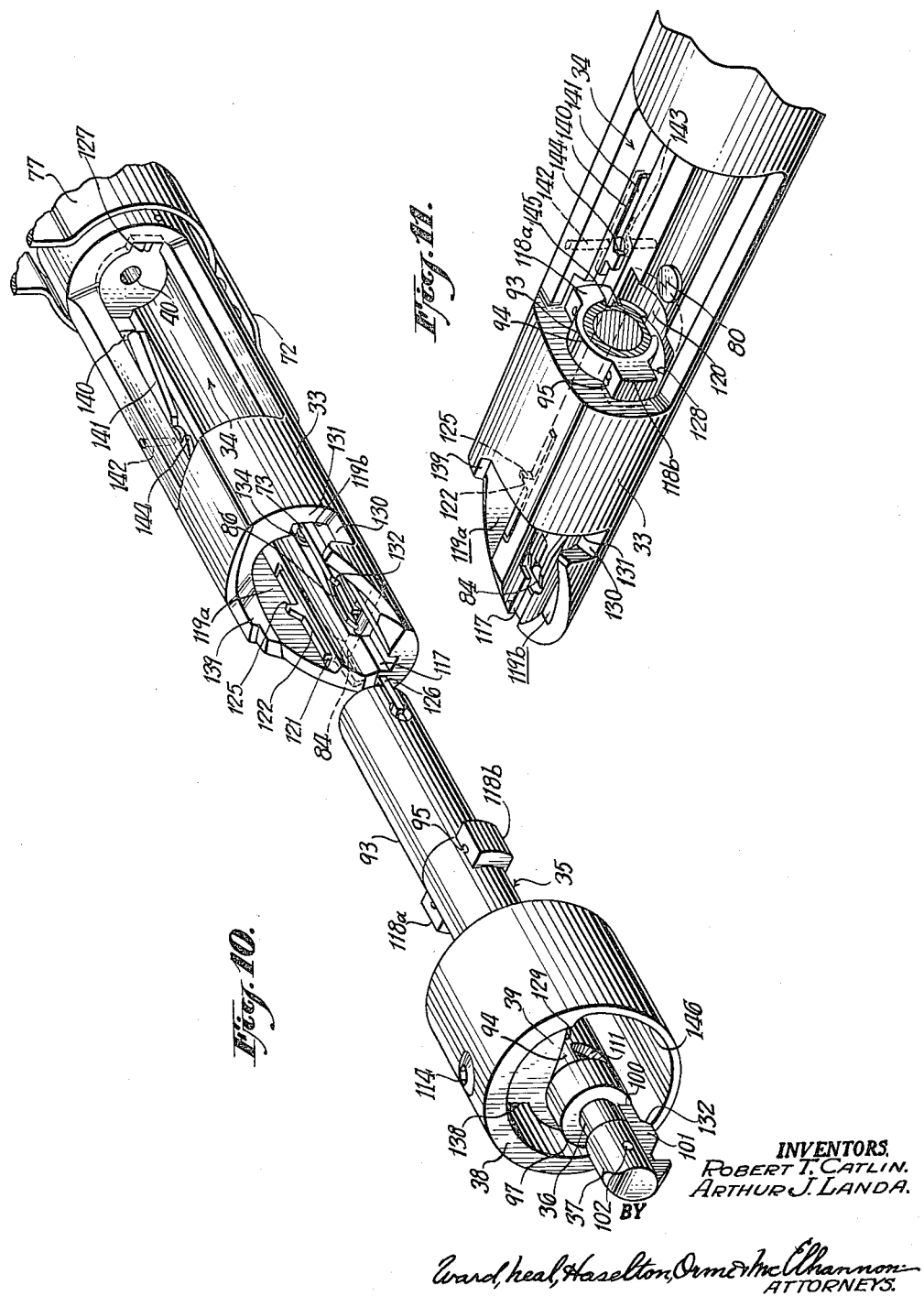

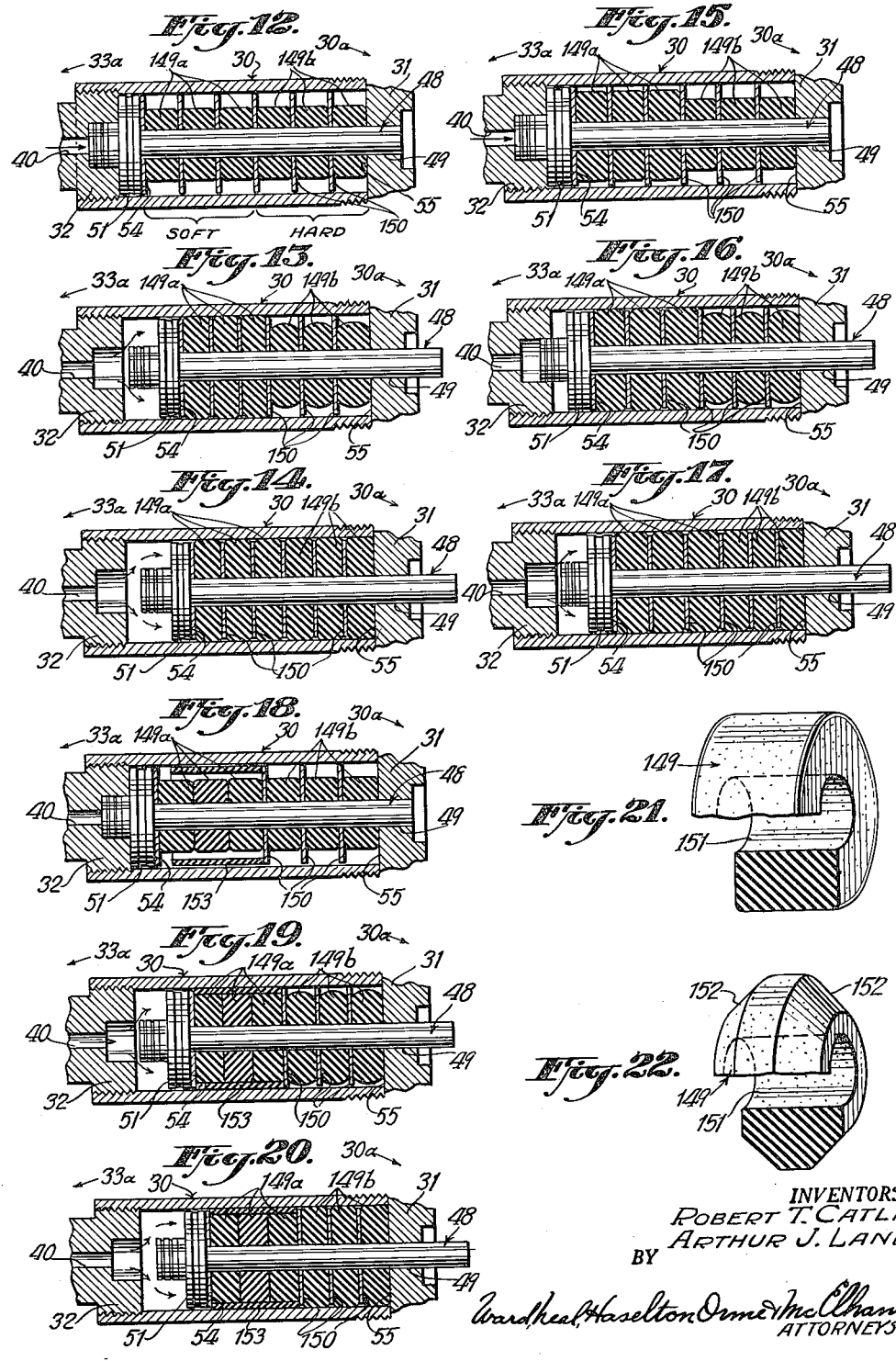

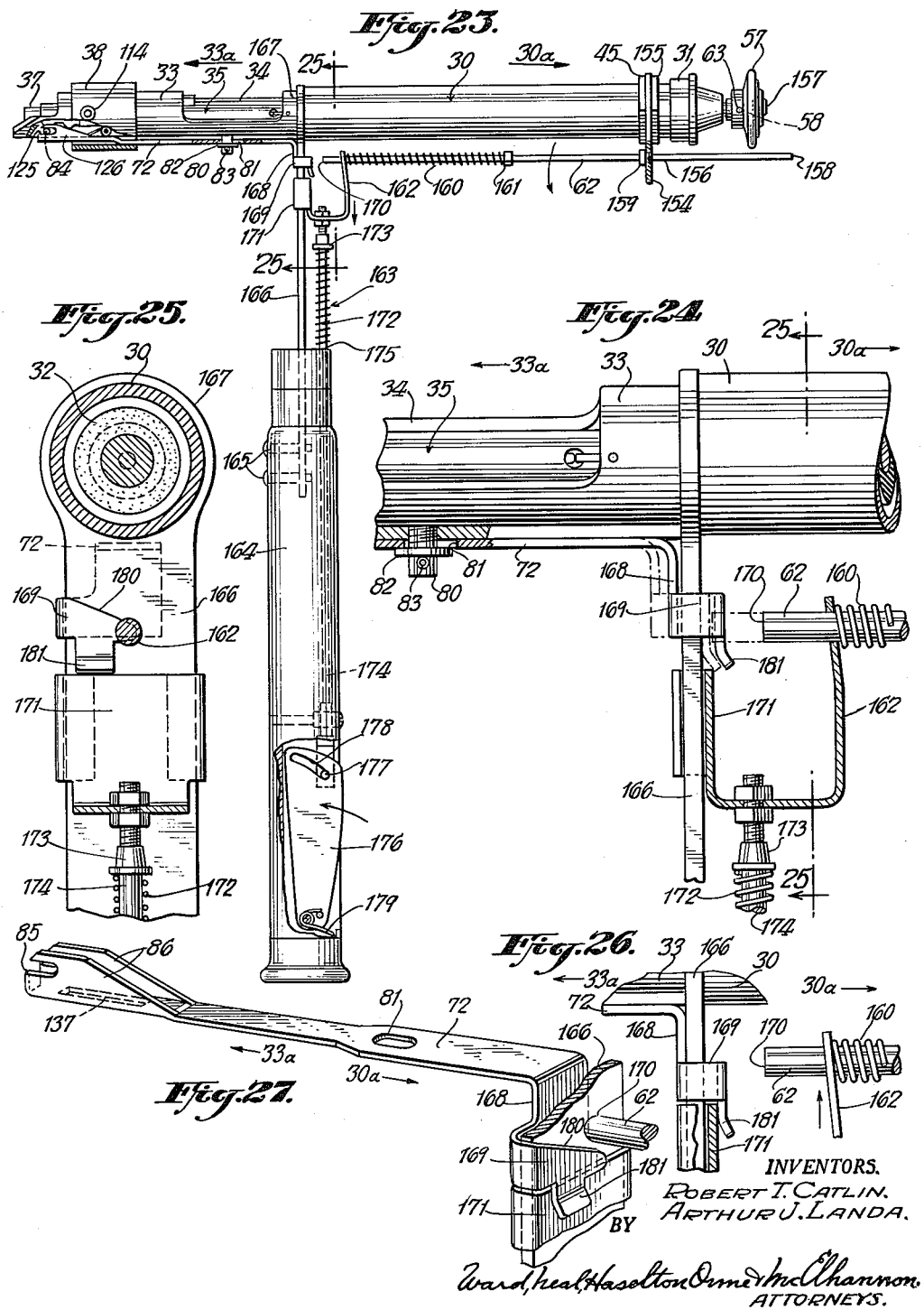

3,067,454
EXPLOSIVELY ACTUATED ANIMAL STUNNING TOOL
Robert T. Catlin, Trumbull, and Arthur J. Landa, Shelton, Conn., assignors to Remington Arms Company, Inc., Bridgeport, Conn., a corporation of Delaware
Filed May 19, 1960, Ser. No. 30,727
11 Claims. (Cl. 17—1)

This invention relates to animal stunning tools for the humane stunning of animals, such as cattle and the like prior to slaughtering. More particularly, the invention relates to explosively actuated stunning tools for the purpose.

Generally, animal stunning tools incorporate either a penetrator type or a concussion type stunning instrument, the proper selection and application of both types being known in the trade. The tool of the present invention may be provided with, and is effective using either type instrument.

The invention provides an explosively actuated stunning tool which is safe, easy to operate using only one hand, and effective for causing instantaneous stunning of an animal prior to its slaughter. The tool is relatively light in weight, economical and efficient, and overcomes many of the difficulties of similar tools which have been used heretofore.

For example, lambs, hogs, steers, bulls, calves and, in fact, all types of animals may be stunned by the tool herein provided without the need of additional equipment. The difficulties found in prior devices of the kind also include ineffective stunning through inadequate velocity and power of the stunning instrument, insufficient dampening of recoil and counter recoil in the tool, causing operator fatigue and error, and improper arrangement and construction of tool parts tending to cause twisting and other uncontrolled movement of the tool due to forces of inertia acting during and immediately after firing. Furthermore, some explosively actuated stunning tools break down during use due to inadequate dampening, or braking of the piston driver element upon firing the tool, the element destroying itself or the tool by repeated impacts against abutting elements within the barrel.

In the case of penetrator type tools, the distance of travel of the penetrator instrument has not always been accurately determined or regulated, sometimes permitting too great penetration which kills, rather than stuns the animal. The parts of some penetrator tools, such as the trigger mechanism, are situated or arranged such that they become clogged by hair, flesh, and other animal body portions during use, such necessitating frequent work stoppage to clean the tool. Moreover, means have not been provided or, where provided, have been ineffective to prevent the penetrator instrument from sticking in the bone structure of the animal.

Where a concussion knob is preferred as the stunning instrument to be used, prior devices have been subject to severe and sometimes uncontrollable recoil which presents a safety hazard to the operator, and likelihood of damage to the tool upon firing by its rebounding off the animal against the walls of the knocking pen and other places. Usually an extended handle of the tool is provided for operator convenience in extending the tool into the knocking pen from the operator's station and for safety purposes to assure that the operator will be clear of the rebounding tool. However, such handles have necessitated inclusion of relatively complicated and exteriorly located tool actuating linkages and other parts which may not always function properly and which are susceptible to accidental damage because of their exposed condition.

These and other disadvantages of prior animal stunning devices are overcome by the present invention. Generally describing the operation of the tool which is here provided, a small caliber blank cartridge is fired within the device to drive the stunning instrument into contact with the animal. As will be seen, the stunning instrument will be immediately and automatically retracted at the end of its stroke, yet the operator will realize very little tool "kick" during use. The tool has a barrel section linearly aligned and attached to a receiver section which mounts a bolt firing mechanism. The tool is arranged so that, by a simple, counterclockwise twisting and withdrawal motion, the bolt mechanism may be drawn away from the barrel section to expose an axially aligned cartridge chamber at the receiver end of the barrel section wherein the small caliber, blank cartridge power load is inserted. After inserting the cartridge, the bolt mechanism is moved forward and rotated in clockwise direction to close and lock the cartridge chamber. Alternatively, it may be rotated only a few degrees to a safety position in which it is impossible to fire the tool but in which the bolt cannot be accidentally withdrawn, or it may be rotated a substantially greater amount, about ninety degrees, to the firing position of the tool.

When the tool has been loaded and is positioned for firing, the operator takes the tool in one hand and simply moves it against, or near the animal's head and fires it. The pressure of the expanding gases from the exploded cartridge impels a slidable piston within the barrel section, to which the stunning instrument is attached, a predetermined short distance forward to move the instrument into sudden impact with the animal to stun it. The tool provides full retraction and repositioning of the stunning instrument immediately after firing to its initial, pre-firing position ready for the next stunning operation. The entire operation is quick, safe, and instantaneously effective to render the animal unconscious in a painless manner by a single blow of the stunning instrument.

The retraction feature causes instantaneous withdrawal of a penetrator type instrument from the animal's head, thereby preventing its sticking in the bone structure which can cause wrenching of the tool from the operator's hand, or his loss of balance as the animal falls, as well as inconvenience in removing the tool from the animal. The tool is designed to propel the stunning instrument forward the desired distance with just the proper amount of power required to stun the animal, yet not kill it, and to fully retract the instrument, taking into consideration the amount of energy which is absorbed by the animal. Furthermore, it will be found that recoil and counter recoil of the tool are hardly noticeable to the operator, and that the tool will have almost no tendency to twist or otherwise move erratically during use. This substantial elimination of tool "kick" assures greater operator overall efficiency because, in general, the operator will experience fewer "misses," and need not overly concern himself with safety precautions during an operation.

Referring more particularly to the tool construction, the invention provides a novel piston buffer system within the barrel section which, prior to firing the tool, extends the full length of the barrel. The buffer assembly generally consists of a stack of buffer rings of elastically deformable material, such as neoprene, polyurethane or the like, and interposed metal impact rings. The assembly surrounds the portion of the stunning instrument which is within the barrel, and extends between the piston and the abutment wall at the muzzle end of the barrel so as to be compressed by the piston as the latter is impelled towards the muzzle and by the explosion of the powder charge. The elastically deformable buffer rings have diameter somewhat less than the internal diameter of the barrel and are relatively thick, so that during compression, they expand into contact with the barrel wall. As will be seen, the buffer system provides controlled braking of the piston element during its forward travel. Because of the elastic nature of the buffer rings, the system also causes repositioning of the piston to its normal location at the receiver end of the barrel, and therefore full retraction of the attached stunning instrument instantaneously after stunning has been effected. Modifications of the form, characteristics and arrangement of the buffer rings, as will be described, will provide modified piston braking effects in the tool, yet instantaneous retraction of the stunning instrument upon completion of the firing cycle.

A novel, ring type bolt is also provided which materially contributes to effective operation of the tool. Normally, bolt operated guns and explosively actuated tools have a relatively heavy, metal lever extending outwardly from the bolt and receiver section which the operator grasps and lifts to withdraw the bolt and open the breech of the device. In the present invention, this extending lever is eliminated and replaced by a light-weight ring, of plastic or the like, which sleeves around the receiver section of the tool in relatively close fitting relation when the bolt is in its closed position. The novel ring type bolt is more durable than is the lever type, being not susceptible to breaking off by accidental impact. Further, and aside from its light weight which causes a reduction in the total inertia of the tool under dynamic conditions of firing, the ring bolt eliminates the setting up of unbalanced inertia forces during tool firing which normally would occur due to the irregularly extending, relatively heavy moment arm of a lever were such provided. These forces would cause twisting or other erratic movement of the tool upon firing.

A preferred construction of the tool trigger mechanism does not include a trigger lever of the well-known, finger-operated type ordinarily found in guns and the like. It has been found that such trigger levers transmit a considerable amount of tool recoil and counter recoil to the finger or hand of the operator, causing soreness and resulting fatigue in the hand. Instead, a hand-pressure actuated trigger lever is provided which extends parallel to the barrel towards the muzzle end of the tool. It pivots at the general location of the junction between the barrel and receiver sections, and, figuratively speaking, wraps around the tool to the other side where it is coupled to a longitudinally extending sear link which is moved upon trigger actuation to activate the firing mechanism of the tool. In animal stunning tools, it has been found that this novel trigger mechanism not only overcomes the referred to difficulties of the conventional mechanisms, but also promotes the ease with which the tool is operated.

Where an outwardly extending operating handle and an animal-impact type trigger lever is preferred, arranged similarly to that shown in U.S. Patent No. 2,809,391 for example, the novel sear link arrangement and construction which is provided by the present invention may be used, thereby eliminating many parts of the trigger mechanism. When included in such a handle and contact trigger arrangement, the sear link has slightly modified construction at its trigger lever engaging end so as to, in effect, wrap around the extended handle from its receiver facing side into operable association with the trigger lever on the other side of the handle, there also to engage the safety mechanism of the tool which is incorporated in the handle. This construction provides a less complicated and more reliable firing safety mechanism in handle operated tools. It will be found especially useful where concussion stunning is to be effected, since concussion type tools are more often equipped with such extended handles.

Thus, the extremely effective animal stunning tool here described takes only a few seconds to load, position and discharge, and offers convenience and efficiency in operation. It delivers uniform power, time after time, regardless of the operator's skill, allows the operator to station himself safely with respect to the animal, and reduces operator fatigue and error by affording easy operation.

These and other objects and features of the invention will become more readily apparent from the following detailed description thereof when taken with reference to the accompanying drawings in which:

FIGURE 1 is a view, in axial sectional elevation, of a tool embodying the invention as it would appear with its bolt mechanism in withdrawn position, exposing the cartridge chamber in the tool;

FIGURE 2 is a fragmentary view similar to FIGURE 1, to show the tool as it would appear with its breech closed by the bolt mechanism, and immediately after firing the tool, whereupon the stunning instrument is at the end of its stroke;

FIGURE 3 is an enlarged axial side elevation, partially in cross-section, of the bolt member of the tool, to show the details of its construction;

FIGURE 4 is a perspective view of a tool embodying the invention, as it would appear immediately upon firing and in the condition shown by FIGURE 2, to show the general arrangement of the tool;

FIGURE 5 is an enlarged end view of the tool as seen in staggered cross-section viewed from lines 5—5 of FIGURE 1, to show certain details of the novel, ring-type bolt sleeve of the tool;

FIGURE 6 is a perspective view of the sear link element of the tool;

FIGURE 7 is an enlarged view in cross-section taken at lines 7—7 of FIGURE 1, to show details of construction of the trigger lever and sear link attachment in the tool;

FIGURE 8 is an enlarged fragmentary view of the receiver end portion of the tool, in axial sectional elevation as viewed from lines 8—8 of FIGURE 5, to show in detail the operable association between the trigger and firing mechanisms as the parts would appear when the tool is in condition ready for firing;

FIGURE 9 is a view similar to FIGURE 8, showing the parts as they would appear immediately after the tool has been fired;

FIGURE 10 is an exploded assembly view of the breech end of the tool to show how the bolt firing mechanism is mounted in the receiver section of the tool;

FIGURE 11 is a fragmentary view in perspective of the breech of the tool with a cross-sectional fragment of the bolt firing mechanism therewithin to show further details of the operable engagement between the bolt mechanism and receiver section;

FIGURE 12 is a fragmentary diagrammatic view of the barrel section of the tool, in axial sectional elevation, to show a modified form of the buffer system therewithin as normally arranged prior to firing the tool;

FIGURE 13 is a diagrammatic view of the buffer system of FIGURE 12, as it would appear immediately after the tool has been fired, but before the stunning instrument has reached the end of its stroke;

FIGURE 14 is a diagrammatic view of the buffer system of FIGURES 12 and 13 as it would appear when the stunning instrument has reached the end of its stroke;

FIGURE 15 is a fragmentary diagrammatic view of the barrel section of the tool, in axial sectional elevation, to show another modified form of the buffer system therewithin as normally arranged prior to firing the tool;

FIGURE 16 is a diagrammatic view of the buffer system of FIGURE 15 as it would appear immediately after the tool has been fired, but before the stunning instrument has reached the end of its stroke;

FIGURE 17 is a diagrammatic view of the buffer system of FIGURES 15 and 16, as it would appear when the stunning instrument has reached the end of its stroke;

FIGURE 18 is a fragmentary diagrammatic view of the barrel section of the tool, in axial sectional elevation, to show still another modified form of the buffer system therewithin as normally arranged prior to firing the tool;

FIGURE 19 is a diagrammatic view of the buffer system of FIGURE 18 as it would appear immediately after the tool has been fired, but before the stunning instrument has reached the end of its stroke;

FIGURE 20 is a diagrammatic view of the buffer system of FIGURES 18 and 19 as it would appear when the stunning instrument has reached the end of its stroke;

FIGURE 21 is an enlarged perspective view, partially in cross-section, of a preferred form of buffer ring which forms a part of a buffer system of a tool made in accordance with the invention;

FIGURE 22 is a view similar to FIGURE 21 showing a modified form of buffer ring;

FIGURE 23 is a side elevation of a tool embodying the invention to show a modified form of trigger mechanism incorporated therein, the tool in condition ready for firing;

FIGURE 24 is an enlarged fragmentary side view, partially in section, of the tool of FIGURE 23 to show certain details of a portion thereof;

FIGURE 25 is an enlarged fragmentary side view of the tool of FIGURE 23 taken at lines 25—25 of FIGURES 23 and 24;

FIGURE 26 is an enlarged fragmentary side view, partially in section, of the tool of FIGURE 23 to demonstrate the action of the tool safety mechanism to prevent firing of the tool; and FIGURE 27 is an enlarged perspective view of only the sear link and portions of the safety mechanism and trigger lever of the tool of FIGURE 23 to demonstrate the action of the safety mechanism in greater detail.

The general arrangement of the animal stunning tool provided by the invention is best described by reference to FIGS. 1 and 4. The tool has a barrel section 30, enclosed at muzzle end 30a of the tool by a muzzle cap 31 and at the breech end 33a of the tool by a chamber plug 32, and an attached receiver section 33. The breech 34 of the tool is located in the receiver section 33 which has hollowed construction to receive the slidably mounted bolt firing mechanism of the tool which generally comprises a bolt member 35, a firing pin 36 having an attached firing pin head 37, and a cylindrical bolt sleeve 38. The bolt sleeve is attached to a handle portion 39 of the bolt member for grasping to move the bolt mechanism into and out of operable association with the cartridge chamber 40 axially formed within chamber plug 32, the forward end 41 of the bolt member engaging the receiving-facing surface 42 of the chamber plug when the tool is in condition ready for firing.

In one embodiment of the invention, as shown by FIGS. 1, 2 and 4, firing action is initiated by hand pressure on the longitudinally arranged trigger lever 43, the tool having been grasped with the hand surrounding its barrel and placed against, or near the animal's head. By a simple squeezing motion, trigger lever 43 activates the firing mechanism as will be seen.

To minimize the possibility of the tool slipping from the hand, barrel section 30 has a surrounding hand grip 44 which is made of vulcanized rubber-impregnated fibre, plastic, or the like and which is held in place by the hand grip nut 45, against the surface 46 of the trigger bracket 47. It becomes apparent that the tool is easily operated and involves the use of only one hand by the operator.

Firing of the tool will cause a stunning instrument, generally indicated in FIG. 4 by numeral 48, to shoot forward a short distance, about three inches, from the muzzle of the tool into contact with the animal to be stunned, and to thereafter instantaneously retract to its initial position. Its movement is linear, in axial direction, through aperture 49 of the muzzle cap 31 in response to explosion of a cartridge powder charge 50 placed within chamber 40. The expanding powder gas impels the piston 51, which is slidable within the barrel and to which the stunning instrument is attached, toward the muzzle end of the tool. Piston travel, and hence the stroke of the stunning instrument, is limited and determined by the elastically deformable buffer system of the tool, generally indicated by numeral 52, which surrounds but is slidable on the piston rod 53 and extends substantially the full length of the barrel section between the muzzle-facing, buffer abutment surface 54 of the piston 51 and the buffer abutment surface 55 of the muzzle cap 31.

As previously indicated, the stunning instrument, generally indicated in certain figures of the drawings by numeral 48, may be a penetrator type instrument formed by the piston rod 53, itself, having a cup-shaped stunning instrumentality 56 at the free, muzzle end 58 thereof as shown in FIGS. 1 and 2 example, or for a concussion type instrument wherein the stunning instrumentality comprises a concussion knob 57 attached at the end of piston rod 53 as shown by FIG. 23. Use of either type stunning instrument may be preferred depending upon conditions and for reasons well known to those having skill in the art, and the tool is adaptable for interchange of stunning instruments for the purpose.

In normal position prior to firing the tool, the animal contacting end 58 of a penetrator type instrument resides within the tool a short distance behind the exterior shoulder 59 of muzzle cap 31, as shown by FIG. 1. This short distance, called the "stand-off" distance, permits the instrument to attain considerable velocity before emerging from the tool to strike the animal, thereby assuring effective penetration and stunning. A bored recess 60 of the muzzle cap is provided, in depth about a quarter of an inch and having diameter considerably larger than that of muzzle cap aperture 49, which serves several functions. It provides an interior shoulder 61 to visibly guide the operator in assuring that the end 58 of the instrument has the proper amount of "stand-off" to achieve the desired velocity consistently during sequential firing operations, the end 58 normally residing in the plane of shoulder 61. The widened recess 60 also tends to reduce recoil in the tool as it strikes the animal.

On the other hand, a concussion type stunning instrument, as shown by FIG. 23, has a concussion knob 57 attached at the free end 58 of the piston rod 53, as by a screw 63. Whereas in penetration stunning the tool is placed in contact with the animal at exterior shoulder 59, in concussion stunning the tool is oriented with respect to the animal so that the knob 57 is a short stand-off distance, about one inch or so, away from its head. To accurately gauge this stand-off distance, an extending, animal-contact type trigger lever member 62 is sometimes preferred, and the tool is adaptable to such construction, as will be seen.

The arrangement of the parts and the operation of the tool having been described generally, its construction will now be described in greater detail.

At the muzzle end 30a of the tool, the muzzle cap 31 may be internally threaded, as at 64, for attachment to barrel section 30 on external threads 65 thereof. Threads 64 may also be utilized to engage the hand grip nut 45, as shown in FIG. 1.

In the preferred embodiment illustrated, attachment of receiver section 33 to barrel section 30 is effected by the chamber plug 32 which has external threads 66 and 67 for engaging internal threads 68 and 69 of the barrel section and receiver section, respectively. At the junction, chamber plug 32 has an annular straight surface 70 of diameter greater than that of threads 67, but less than that of threads 66 for engagement thereover of the trigger bracket 47, usually in a press fit attachment, by its aperture surface 71.

The trigger bracket 47 is a part of the trigger mechanism of the tool which also includes the trigger lever 43, a sear link 72 mounted for longitudinal movement on receiver section 33, and a sear 73. For a better understanding of the trigger mechanism, particular reference is made to FIGS. 6 through 9 of the drawings which should be taken in conjunction with FIGS. 1, 2 and 4.

It is seen that trigger bracket 47 has extending portions 74 and 75 thereof which are apertured for insertion of a transversely extending trigger pivot pin 76. The trigger lever 43 has hollowed, or inverted U-shape configuration and is apertured through its side portions, near its receiver-facing end, for pivotal connection on the pivot pin 76, as indicated, so that it extends along the barrel section 30 on one side of the tool. Trigger lever 43 also has a receiver-surrounding sleeve portion 77 formed by the half-cylinder shaped, depending extension portions 77a thereof which are joined together, as by welding, to form a lug 78 for engaging the sear link 72 disposed on the opposite side of the tool, the lug 78 fitting loosely in aperture 79 of the sear link. The sear link 72 is supported along receiver section 33 by extension of the bolt member guide pin 80 outward through the receiver section to engage the slot 81 of the sear link, as shown by FIG. 1. A washer 82 and pin 83 of the guide pin 80 hold the sear link in place at its midportion, and a transversely extending pin 84 mounted in the body of the receiver section 33, engages end slots 85 formed in upturned side portions 86 of the sear link at its receiver end to hold it in place at this end location.

A hairpin spring 87 biases the trigger lever 43 away from the barrel section 30, the spring 87 being looped, as at 88, around pivot pin 76 so that its leg portion 89 rests against the surface of hand grip 44 and its other leg portion 90 is in pressure engagement with the underside surface of the trigger lever 43. Because of the biasing pressure, the end edge surface 91 of the trigger lever sleeve portion 77 will normally rest upon the receiver-facing end surface 92 of trigger bracket 47. As will be understood by reference to FIG. 2, hand pressure on trigger lever 43 will urge it in clockwise direction, in the drawing, toward barrel section 30 and against the bias of spring 87, and its pivotal movement about pivot pin 76 will cause clockwise movement of receiver-surrounding sleeve portion 77, and consequent substantially longitudinal movement of the lug 78 a short distance toward the breech end 33a of the tool. The lug 78 carries the sear link 72 in longitudinal direction toward the breech end a similar distance which is sufficient to permit actuation of the sear 73 to trigger the firing mechanism in the bolt member 35 in a manner to be described.

For a better understanding of the firing action of the tool, reference should first be made to the construction of the bolt member 35 and its arrangement with respect to receiver section 33. In FIGS. 3 and 10 it is shown that the bolt member 35 has a head portion 93 and a body portion 94 connected for rotation with respect to the head end portion, as by straight pins 95 which tangentially engage the peripheral groove 96 of the latter. A bolt plug 97 is loosely threaded within bolt body portion 94, as by NC-2 threads 98, in a manner to permit the body portion 94 to rotate about ninety degrees with respect to the plug 97 during the priming of the tool to its firing condition, as will be later discussed. Bolt plug 97 has an aperture 99 therethrough for slidable passage of the firing pin 36, and has a rectangular slot 100 to slidably receive the extended key portion 101 of the firing pin head 37, the head 37 being firmly attached to the firing pin 36, as by attachment pin 102. Because of the key 101 and slot 100 arrangement, the firing pin head 37, and consequently the firing pin 36, is not rotatable with respect to the bolt plug 97.

Firing pin 36 has a central body portion 103 slidable within the bore 104 of bolt head portion 93 and a pointed striker portion 105 which is axially offset from the firing pin axis so as to strike the rim of the cartridge 50 when the tool is fired. A recess 106 is provided in the forward end 41 of the bolt member to receive the rimmed portion of the cartridge when the bolt is moved against chamber plug 32, as previously described, and the striker portion 105 will move through aperture 107 to sharply strike and fire the cartridge 50. Such sharp, firing movement will be caused by a sudden release of tension in the main firing spring 108, as will be seen.

The main firing spring is assembled between the shoulder 109 of the firing pin central body portion 103 and the shoulder 110 formed by the end of bolt plug 97, the bias of the spring acting against these shoulders. To assemble the bolt member 35, bolt head portion 93 and bolt body portion 94 are first connected by appropriate press fit insertion of straight pins 95. The firing pin 36, absent firing pin head 37, is then inserted into the bore of the member, the striker portion 105 aligned within aperture 107. Spring 108 is then inserted over the pin 36 and against shoulder 109 thereof. Next, the bolt plug 97 is fitted over the firing pin 36 and threaded into the bolt body portion 94. The number of turns given the plug 97 on threads 98 will be sufficient to provide an appropriate "stand-off" distance of the end of the striker portion 105 from the forward end 41 of the bolt member when the assembly has been completed. Finally, the firing pin head 37 is attached to the firing pin 36, as by attachment pin 102, the key portion 101 thereof fitting into the slot 100 of the bolt plug 97.

As shown in FIGS. 3 and 10, the bolt body portion 94 has a notched cam surface 111 formed at a location on its end periphery, and a notched detent 113 also therein, which is in ninety-degree offset relation with respect to the bottom of cam surface 111. When the tool has been fired, the end edge 112 of the firing pin head key portion 101 will lie against the bottom of the notched cam surface 111, and it becomes apparent that the firing pin 36 may be "cocked," or primed against the bias of main firing spring 108 by rotating the bolt body portion 94 ninety degrees, in counterclockwise direction with respect to the bolt head portion 93, the bolt plug 97 and, consequently, the firing pin head 37 which is keyed into plug 97 as previously described. The rotative movement between these parts forces end edge 112 to follow up the slope of the cam surface 111 and off the end thereof to rest in the notched detent 113. The enforced longitudinal movement of the firing pin head 37 withdraws firing pin 36 a short distance, causing shoulder 109 thereof to sufficiently compress spring 108 against the stationary shoulder 110 of bolt plug 97 to prime the firing mechanism.

When the bolt member 35 has been mounted in receiver section 33, this priming action will be effected by grasping and rotating the cylindrical bolt sleeve 38 in counterclockwise direction, the bolt sleeve 38 being attached, as by screw 114, to the protruding bolt handle portion 39 which is formed on bolt body portion 94, as by brazing or welding. Thus, twisting of the sleeve 38 will twist body portion 94 with respect to both the head portion 93 and the firing pin head 37 to achieve the priming, these members being held against rotative movement by other coacting elements. The bolt head portion 93 has a longitudinally extending slot 116 on its undersurface which slidably engages bolt member guide pin 82 to prevent its rotative movement, and the firing pin head key portion 101 slidably engages the longitudinally extending slot 117 of the receiver section 33 to prevent its rotative movement when the tool is being primed. On the other hand, the bolt body portion 94 has two outwardly extending guide lugs 118a and 118b, one on each side at its head portion associated end, which slide in corresponding interior side slots 119a and 119b of the receiver section 33 as the bolt member is pushed forward for engagement of its forward end 41 with chamber plug surface 42. The lugs 118 are free to rotate, in response to the aforesaid twisting motion, in the interior, semi-circumferentially extending slot 120 at the bottom of receiver section 33.

With these elements and arrangements in mind, a complete understanding of the loading, priming and firing of the tool may now be had from a description of its operation, several additional elements to be referred to as the description proceeds.

Prior to mounting the bolt member 35 within the hollowed receiver section 33, the bolt member is placed in its "primed" condition, the end edge 112 of firing pin head key portion 101 resting in the notched detent 113. In this condition, guide lugs 118 of the bolt body portion will be oriented ninety degrees away from a longitudinal plane through key portion 101 so that, as the bolt member is assembled onto the receiver section, these lugs 118 slide into side slots 119 as the key portion 101 slides into slot 117.

The receiver section 33 has a longitudinally extending slot 121 which is offset from the bottom centerline of the receiver section, as shown in FIG. 10, for reception of a bolt stop 122 mounted therein on pin 84 and biased upwardly by a spring 124 into one of the interior side slots 119a of the receiver section. When the bolt member 35 is assembled onto the receiver section 33, one of the guide lugs 118a thereof will ride over the protruding portion 125 of the bolt stop 122, momentarily forcing the bolt stop to pivot downwardly on pin 84, against the bias of spring 124 whereupon, when the lug 118a has passed thereover, bolt stop 122 will spring upwardly into its normal position whereat its portion 125 will prevent bolt member 35 from wholly disengaging receiver section 33 during tool operation. In operation, when the bolt member is in its withdrawn position to expose the cartridge chamber 40, its lug 118a is against protruding portion 125 of the bolt stop. Of course, to remove bolt member 35 from the receiver section, one would lift the free end of the bolt stop 122 against its spring bias sufficiently to withdraw its protrusion 125 from slot 119a to permit the lug 118a to again pass thereover, as will be observed from a study of the drawings.

Leaving the bolt member 35 in its withdrawn position as shown by FIG. 1, the breech 34 of the tool is open so that a blank cartridge 50 may be placed in the cartridge chamber 40. Bolt member 35 is then pushed forward towards chamber plug 32, closing the breech 34, the guide lugs 118 sliding within receiver section side slots 119. The protruding, cam-shaped front end of the cartridge extractor 126, which is pivotally mounted in the side of bolt head portion 93 and spring biased toward its central axis, will come into contact with the outer edge of correspondingly cam-shaped extractor groove 127 formed in the surface 42 of chamber plug 32, and the forward end 41 of bolt member 35, therefore, will not be against the chamber plug surface 42. But, at this point, the rearward edge of guide lug 118b will have reached the start of the downward and longitudinally directed interior cam surface 128 on the rearward edge of semi-circumferentially extending interior slot 120 of the receiver section. This cam surface 128 is arranged to lead the lug 118b into the slot 120 upon clockwise twisting movement being exerted on bolt sleeve 38. As the lug 118b travels the short distance over the cam surface 128 during the few degrees of clockwise rotation, the bolt member 35 will be forced forward the short remaining distance necessary to bring its forward end 41 into abutting engagement with surface 42 of the chamber plug, the rim of the cartridge fitting into the recess 106 of the former. The extractor 126, of course, will snap over the peripheral rim of the cartridge 50 into the extractor groove 127 due to its spring bias. Simultaneously, these few degrees of clockwise rotation of bolt body portion 94 will cause the end edge 112 of firing pin head key portion 101 to ride out of the notched detent 113 onto the short, flat end surface of the bolt body portion 94 which lies between the detent 113 and the start of the surface track of notched end cam 111.

In this condition, the bolt member 35 has been moved into association with the cartridge chamber 40 but the tool will not fire because end edge 112 of key portion 101 of the firing pin head is against this short end surface of bolt body portion 94 and therefore cannot travel forward in response to any trigger action of the tool to permit the firing pin 36 to strike the cartridge 50. Thus, a safety position of the tool has been established wherein, upon only a few degrees of clockwise rotation with respect to the receiver section 33, the bolt member 35 is locked in association with the cartridge chamber yet it is impossible to fire the tool. This safety position is clearly sensed by the operator as the rearward surface of lug 118b rides off the forward end of cam surface 128 into slidable engagement against the rearward wall of the interior slot 120.

To place the tool in condition for firing, the bolt sleeve 38 is further twisted in clockwise direction a full ninety degrees, which is determined by the edge 129 (FIGS. 5 and 10) of the bolt handle 39 coming into abutting contact with the edge 130 (FIG. 1) of the slot 131 in the receiver section 33, the bolt handle portion 39 riding in the peripheral slot 131. This further rotation of the bolt body portion 94 with respect to the other elements of the bolt member 35 brings its notch 111 in line with the firing pin head key portion 101 and such positioning of these parts would permit the firing pin head 37, and hence the firing pin 36 to travel a longitudinal distance equal to the depth of the notch 111 so as to fire the tool were it not for the engagement of key portion 101, by its depending angular surface 132, with the corresponding angular surface 133 of the sear 73 as shown in FIG. 8. These surfaces are held in abutting engagement, which prevents the firing pin 36 from moving forward until the tool is triggered, by the upward biasing force exerted on the sear 73 by its mounting spring 134 and by the positioning of the surface portion 135 of sear link 72 under the lower surface 136 of the sear 73 when trigger lever 43 is biased by hairpin spring 87 to its normal, pre-firing position. It is to be noted that the biasing pressure of the sear spring 134, alone, is not sufficient to prevent the movement of firing pin head 37, and it therefore becomes apparent that firing of the tool is achieved by longitudinal movement of the sear link 72, in direction toward the breech end 33a of the tool, a distance sufficient to bring its slot 137 under the lower surface 136 of the sear. Thus, when sear surface 136 rides off the sear link surface 135 into the sear link slot 137, the biasing force of main firing spring 108 pulls the firing pin 36 forward, sharply, to strike and explode cartridge 50, since the angular surface 132 of the key portion 101 will force the sear 73 downwardly into the slot 137 against the sear spring bias.

After the tool has been fired, the bolt sleeve 38 is grasped and rotated ninety degrees in counterclockwise direction, determined by abutting engagement of the edge 138 (FIGS. 5 and 10) of bolt handle portion 39 with edge 139 (FIGS. 1 and 10) of the slot 131 of the receiver section 33, to immediately again effect "priming" of the firing pin 36 by forcing end edge 112 of firing pin head key portion 101 to ride up the notched cam surface 111 to fall into the notched detent 113 at the end of the rotated bolt body portion 94. The bolt member 35 is then slidably withdrawn against the bolt stop 122, guide lugs 118 riding within side slots 119.

Simultaneously with the withdrawal movement, the extractor 126 extracts the now spent cartridge 50 from its chamber 40, pulling it outward into juxtaposition with the ejector 140 so as to be ejected from the breech 34 of the tool. Ejector 140 is longitudinally mounted in a slot 141 of the receiver section 33 by a pin 142. It is biased by ejector spring 143 into its normal position within the slot 141 and, when the bolt member 35 is withdrawn, its protruding portion 144 will be struck by the end (not shown) of the slot 145 of bolt head portion 93 in which it rides so that the ejector will be thereupon pivoted outwardly into the breech 34 into contact with the withdrawn cartridge 50 to eject it from the tool, as is conventional in ejector operation. The tool is now ready to be reloaded for another stunning operation.

The construction and arrangement of the novel cylindrical bolt sleeve 38 should be noted in conjunction with the results thereby afforded in the operation of the tool. It is of a convenient diameter and length for easy grasping, and it closely surrounds the receiver section 33 when the breech 34 is closed. The sleeve 38 has a cutaway portion, as at 146, so as to be clear of sear link 72 as the sleeve is rotated, yet assure the closeness of its fit around the receiver section. Further, it is made from lightweight material, such as vulcanized rubber-impregnated fibre, plastic, or the like, so as to reduce the total inertia of the tool when it is fired. Its cylindrical configuration, and its close fitting relationship surrounding the receiver, further balance and eliminate other inertia forces which would come into play upon firing the tool were a conventional, lever-type bolt handle to be used. For example, if a lever handle were used, its proportionately greater mass would extend outward on only one side of the tool, creating an unbalanced tool weight at the end of a lever, in effect, which, in turn, upon firing the tool would tend to cause the tool to pivot, or swing out of alignment with the animal due to the inertia of the mass and the recoil forces in the tool. Further, immediately after initial recoil, the tool will be subject to counter-recoil which occurs when the piston "bottoms," or comes to a stop against the muzzle end abutment within the barrel of the tool, and such counter-recoil will immediately reverse the recoil forces which have been acting upon the tool. It is seen that the tool would be subject to erratic movement due to these forces and counter-forces, whereupon the tool would be difficult to control in the hands of the operator. A "miss" might be effected, so that the animal is only painfully injured rather than stunned, or the tool might fall from the operator's hand. Provision of the cylindrical bolt sleeve 38, instead of a conventional lever type handle, eliminates these possibilities.

Referring now to the stunning instrument driver elements within the barrel section 30 of the tool, the piston 51 has a receiver-end portion 147 of considerably smaller diameter than its main body portion. In the normal condition of the tool prior to firing, the portion 147 resides within bore 148 of barrel plug 32. The depth of the bore 148 and the corresponding height of the piston portion 147 is such that the bore volume will contain the powder gases which are generated at the instant of explosion of cartridge 50 to assure complete burning thereof before they are permitted to expand into the considerably greater diameter 30b of the barrel section. Of course, the piston has been initially driven forward by the explosion the distance equal to the depth of bore 148 within this instant.

As has been stated, the barrel enclosed portion of the piston rod 53 is slidable through a surrounding buffer system, generally indicated by numeral 52, which absorbs piston energy and brakes the piston 51 during its travel towards the muzzle end of the tool when cartridge 50 is exploded. As shown by FIG. 2, buffer system 52 is an assembly of alternately and contiguously arranged elastically deformable buffer rings 194 and metal impact discs or rings 150 in slidable engagement around the stunning instrument shaft 56. Buffer rings 149 are made of neoprene, polyurethane, or similar material and have diameter considerably smaller than the internal diameter 30b of barrel section 30. Referring to FIG. 21, each buffer ring 149 has a relatively thick, cylindrical shape and is centrally apertured, as at 151, for slidable passage of the piston rod 53 therethrough. The impact rings 150 are relatively thin and have a diameter corresponding to the interior diameter 30b of the barrel section 30 for slidable movement therein, and are also apertured for passage of the piston rod 53 in the same manner as are buffer rings 149.

In a preferred embodiment of the invention, about eleven steel impact rings 150 and twelve buffer rings 149 are used to provide a buffer system within the barrel of the tool. The stack thereof extends the available length of barrel section 30, being slidably interposed between its breech end abutment surface 54, on piston 51, and its muzzle end abutment surface 55, on muzzle cap 31. Moreover, the buffer system 52 is preferably in slightly compressed condition when the piston 51 is in its normal, fully retracted position prior to firing the tool, as shown in FIG. 1.

It is intended that when the tool is fired, the stunning instrument 48 will be driven forward by the piston 51 a short distance toward the muzzle end 30a of the tool, through the aperture 49 of muzzle cap 31, into contact with the animal to be stunned. As shown by FIG. 2, at the end of its stroke, the stunning instrument has moved forward only a few inches until the buffer system 52 is fully compressed, the impelling movement of the piston being in response to explosion of the cartridge 50.

The resilience of the elastically deformable buffer rings 149 causes buffer system 52 to recover its normal length and arrangement within the barrel section 30 substantially instantaneously, as soon as the energy of the powder charge has been expended. Thus, the stunning instrument 48 is immediately returned to its fully retracted position within barrel section 30 as soon as it has completed its stroke.

It will be noticed that the resiliency of the buffer rings 149 also causes them to expand radially outward towards interior surface 30b of the barrel 30 during compression of their lengths when the tool is fired. The amount of expansion is sufficient to cause frictional contact with the barrel interior surface 30b so as to impart a braking effect between the buffer and the barrel which is in addition to the braking effect caused by simple compression of the buffer rings 149. As will be seen, other arrangements and construction of the buffer system provide a selection of braking effects which may be obtained, the amount and nature of radial expansion of the buffer rings controlling the amount and characteristics of the total braking effect provided by the system on the piston 51.

Thus, where penetration type stunning is effected, immediate elastic recovery by the buffer system of its initial, normal arrangement within the barrel of the tool causes simultaneous withdrawal of the penetrator type instrument from the animal as soon as stunning is effected upon contact with the spinal cord from a location at the base of the skull. There is no danger that the instrument will be imbedded in the animal when it collapses, such being the immediate effect of stunning. Such could cause the tool to be jerked from the operator's hand, or the operator to lose his balance and fall with the animal. The "full length" buffer system causes prompt, full retraction of the penetrator instrument after each firing of the tool so that the tool is safely and easily handled during and between stunning operations.

For penetration stunning of certain types of animals, such as bulls, it has been found that a greater amount of penetration is sometimes preferred, and provision for such may be incorporated in the tool simply by modifying the cross-sectional shape of the buffer rings 149 in the manner shown by FIG. 22. The mass of each buffer ring is reduced significantly by providing peripherally chamfered oppositely disposed edge surfaces 152. The chamfer is considerable in its extent so that, in a barrel length of about eight inches, an additional one inch of penetration will be obtained over a buffer system which includes the rings of FIG. 21, yet the same amount of energy will be absorbed by the tool and the animal.

As has been described, the buffer system of the invention provides a piston braking effect during the course of its travel within the barrel. The braking effect is brought about by axial compression of the elastically deformable buffer rings and also by their coincident elastic expansion in radial direction against the interior wall of the barrel. It has been found that, for best results, the buffer system compression loading curve, which shows braking effect imparted to the piston and stunning instrument, is preferably linear, or nearly linear, with respect to the distance traveled.

It will be seen from consideration of FIGS. 1 and 2 that the arrangement and construction of the buffer system 52 shown therein will provide a curve of buffer system loading which is straight during its initial stages of compression, this being due to the uniform nature of axial compression of all the buffer rings 149, in sequence starting at the breech end 54 of the assembly, but that braking will begin to be more rapidly effected as the buffer rings expand radially into contact and compressive engagement with the barrel wall 30b, as shown by FIG. 2. As a consequence, the load curve will turn sharply and increasingly upwards as the piston travels farther along the barrel length and as each successive ring 149 makes contact.

A greater amount of braking will be effected at earlier stages of piston travel, thus causing a straightening of the buffer system loading curve, by the modified buffer systems shown by FIGS. 12 through 20, inclusive.

In the modification shown by FIGS. 12, 13 and 14, the buffer rings 149a towards the breech end 33a of the tool are considerably softer and therefore more compressible than are the buffer rings 149b towards the muzzle end 30a of the tool. For example, rings 149a may have a hardness of 50, as measured by a durometer test, whereas rings 149b may have a hardness of 75. All of the rings 159 have uniform diameter, as was the case in the embodiment shown by FIGS. 1 and 2. As will be seen from FIG. 13, this varying hardness between groups of buffer rings causes the breech end rings 149a to expand radially into contact with barrel wall 30b sooner than do the muzzle end rings 149b. As will be understood by those having skill in the art, the effect of this arrangement is to heighten the central zone of the loading curve, causing the total curve to be more linear. When the piston has traveled its full distance to a stop, as shown by FIG. 14, all of the rings 149a and 149b have expanded radially into contact with the barrel wall 30b.

A similar effect can be achieved by grouping buffer rings having the same hardness but different diameters. Thus, referring to FIGS. 15, 16 and 17, rings 149a towards the breech end 33a of the tool have greater diameter, but the same durometer hardness, as the rings 149b towards the muzzle end 30a of the tool. As seen in FIG. 16, movement of the piston towards the muzzle end of the tool causes rings 149a to contact the barrel interior surface 30a sooner than do the rings 149b. Hence, the braking effect due to radial expansion of the buffer rings occurs earlier with respect to piston travel, and the loading curve of the buffer system is made more linear.

Of course, it becomes apparent that arrangements may be provided to cause any desired braking effect by varying both the hardness and diameter of one or more of the buffer rings 149 of the buffer system 52.

Still another modification of the buffer system is shown by FIGS. 18, 19 and 20. In this arrangement, buffer rings 149a and 149b have the same diameters, and may or may not have the same hardness, but the buffer rings 149, which are nearest the piston, are surrounded by a cylindrical brake lining 153. The lining 153 may be of rubber, or ordinary brake lining fabric, or any similar material having a measure of resiliency. In its normal position prior to firing the tool, the brake lining 153 has external diameter only slightly smaller than the internal diameter of the barrel. Thus, contact of the brake lining 153 with barrel surface 30a, due to radial expansion thereof in response to radial expansion of rings 149a, occurs almost instantaneously upon firing the tool.

Braking during substantially the full travel of the piston is thereby effected, and such braking increases at a more uniform rate as each ring 149a and then each ring 149b radially expands to sequentially cause increased frictional pressure on the barrel wall 30b. The compression loading curve of the system will be understood to become more linear.

Consideration of the possible variations of buffer ring configuration, hardness, diameter, and effective length lead to the conclusion that buffer rings equipped with surrounding sleeves, and buffer rings having size or hardness variation in the direction of their diameters, or lengths, or both, are within the contemplation of the invention, the design of the buffer system to promote exactly the desired amount and characteristics of piston braking becoming a matter of choice of these variables, once the principles of the invention are understood. The braking effect upon the piston, of course, will significantly reduce the counter-recoil shock which is experienced by the tool upon "bottoming" of the buffer system and piston against muzzle end abutment 55 as they come to a stop at the end of the stroke of the stunning instrument. The feature makes the tool more manageable by the operator since the tool will have little tendency to jerk forward, out of the operator's grasp, at the instant that such "bottoming" occurs. But the "bottoming" effect in the tool is sufficient to counteract initial tool recoil due to the explosion of the cartridge, the two effects occurring so close in time that the initial tendency of the tool to jerk backwards, toward the operator, is counteracted almost at the instant the recoil effect would become noticeable to the operator. As previously stated, the cylindrical bolt sleeve and trigger arrangement prevents tendency in the tool to twist, or otherwise move erratically when fired.

It will be noted that buffer rings 149a towards the breech end 33a of the tool may show wear sooner than do the rings 149b since compression of the system occurs beginning at the breech end and the rings 149a will travel further in frictional sliding engagement with barrel wall 30b than rings 149b. Because of the simple, slidable mounting of the rings on the piston rod 53, replacement of the buffer rings of the system may be postponed, and wear prolonged, by simple reversal of the order of arrangement of the rings on the rod from time to time.

A modified trigger mechanism will now be described in detail, the arrangement including a contact-type trigger member which is more often preferred in the practice of concussion type stunning. Of course, such might also be found useful in penetration type stunning operations.

Referring to FIGS 23 through 27, inclusive, it is seen that the trigger member 62 is mounted along the barrel section 30 (which in this instance need not be covered by the hand grip 44) on one side of the tool, and the sear link 72 is mounted along the receiver section 33 on the same side of the tool. The mounting of the sear link 72 is effected in essentially the same manner as in the previously described embodiment, being slidably mounted near its mid-portion on bolt guide pin 80, which extends through slot 81 of the sear link, and at its breech end by transversely extending pin 84 in the receiver section 33 on which ride the slots 85 of the upturned portion 86 of the sear link. The trigger member 62 is mounted on barrel section 30 by means of a trigger member bracket 154 apertured for attachment on the barrel section 30 against hand grip nut 45, being held in place by the lock nut 155. The bracket 154 is apertured, as at 156, for slidable passage of trigger member 62, the aperture 156 being somewhat larger than the diameter of the trigger member 62 to permit a small amount of pivotal movement, in clockwise direction in FIG. 23, towards the barrel section 30 for a purpose to be described.

The trigger member 62 extends toward muzzle end 30a of the tool a distance beyond the front face 157 of the concussion knob 57 to provide an adequate amount of "stand-off" distance, about an inch or so, of the knob 57 from the animal when the muzzle end 158 of trigger member 62 is in contact with it. An abutment nut 159 is attached to the trigger member 62 to prevent the member from sliding through the bracket aperture 156 towards the muzzle end 30a of the tool in normal pre-firing condition. Thus, the slidable movement of trigger member 62 through aperture 156 upon firing the tool will be towards the breech end 33a.

A biasing spring 160 biases the trigger member 62 towards the muzzle end 30a of the tool, the abutment nut 159 resting against the bracket 154. The spring 160, at its muzzle facing end, rests against a spring abutment nut 161 attached on the trigger member 62. At its other end, towards the breech end 33a of the tool, the spring 160 rests against the trigger member guide extension 162 which is appropriately apertured for slidable passage of the trigger member 62 and which forms a part of the safety means of the tool, generally indicated by numeral 163.

As previously alluded to, such tool may have an extended handle 164 by which the tool is held during use. The handle 164 may be of wood, rubber-impregnated fibre, plastic or the like so that the tool will not slip from the hand of the operator. The handle is attached, as by screws 165, to a steel handle bracket 166 which is firmly attached to the tool at its upper, apertured portion 167 in the same manner as was the trigger bracket 47 in the earlier embodiment, the aperture of the member engaging the straight surface 70 (see FIG. 1) of the chamber plug 32.

The muzzle end portion 168 of sear link 72 is bent approximately, as shown in the drawings, downward along the handle portion 166, the end portion extending around the handle, from the receiver side to the trigger member side thereof, as indicated at numeral 169, the end portion 168 being spaced away from the opposite, or trigger member facing side of the handle. As more clearly seen from FIG. 25, sear link end portion 168, by its handle-surrounding portion 169, is in operable association with the end 170 of trigger member 62 when the tool is in condition ready for firing. It becomes apparent that longitudinal movement of trigger member 62 towards the breech end 33a of the tool in response to contact of its end 158 with the animal will cause its other end 170 to contact the portion 169 at the end 168 of the sear link 72, whereupon the sear link will be moved in longitudinal direction towards the breech end 33a of the tool to trigger the bolt firing mechanism in the same manner as was previously described embodiment. After the tool has been fired, the trigger member 62 is re-positioned in longitudinal direction by the biasing effect of its spring 160, and the sear link 72 will be re-positioned in longitudinal direction to its pre-firing condition by the projecting means 171 of the tool safety means 163, as will be seen.

FIG. 23 shows the tool in condition ready for firing and in this condition the safety means 163, which is mounted along the handle 164 of the tool in the manner shown by the drawings, is in a downward position so that its projecting means 171 is out of engagement with the handle-surrounding portion 169 at the end 168 of the sear link. In this position of the safety means 163, its extension 162 has caused trigger member 62 to pivot about the aperture location 156, in counterclockwise direction as shown by the arrow in the drawing, to bring the end 170 into alignment with the sear link portion 169 as shown by FIG. 25. The safety means 163 is biased against such downward movement by a spring 172 which extends and is biased against the upper abutment nut 173 on the rod 174 and the abutment shoulder portion 175 of the handle 164. Rod 174 is pulled downwardly by the cam action at its lower end where it is attached to the hand-actuated safety lever 176 by means of the pin 177 in engagement with the cam slot 178 in the safety lever 176. The safety lever 176 is normally biased, as by spring 179, to the position as shown by dotted lines of of FIG. 23, in which position the safety means 163 prevents firing of the tool as will be seen.

In this normal condition of the safety lever 176 the safety means 163 is biased into its upper position, as indicated in FIGS. 26 and 27, so that its projecting means 171 is interposed between the portion 169 of the sear link end 168 and the handle bracket 166 within the space between the parts, as indicated, so that the sear link 72 cannot possibly move in longitudinal direction toward the breech end 33a sufficiently to trigger the tool by permitting the sear 73 (not shown in these figures) to drop into the slot 137 of the sear link, as described in detail in connection with the previous embodiment. In the same upward safety position, the safety means extension 162 has pivoted the trigger member 62 towards barrel section 30 in clockwise direction about the pivot location 156, so as to prevent any possibility of operable engagement between the trigger member and the sear link. This dual safety feature is more clearly understood by reference to FIGS. 26 and 27 where it is shown that the portion 169 of the sear link, on the trigger member side of the handle, is cut away, as at 180, so that trigger member 62 at its end 170 cannot possibly engage the sear link, should the trigger member be accidentally moved longitudinally by striking an object at its end 158.

It is to be noted that the handle-surrounding portion 169 at the end 168 of the sear link has a guide extension 181 for guiding the projecting means 171 of the safety means 163 into the space between the handle and the trigger member side of the sear link. It is this guide extension 181 which assures re-positioning of the sear link 72, in longitudinal direction, to its pre-firing condition when the safety lever 176 is released from the grasp to move outwardly from the handle 164 in response to its spring bias 179. By follower action of the pin 177 within cam slot 178, this outward movement permits rod 174 to move upward in response to the bias of its spring 172 to place the tool in safety condition.

The operation of the tool having this modified trigger mechanism and safety means is as follows: A cartridge 50 is positioned within the cartridge chamber 40 and the bolt member 35 is moved forward into operable association with the cartridge by grasping and moving the bolt sleeve 38, as previously described. Note that sleeve 38 may be rotated to its safety position, or a full ninety degrees to tool firing position, as in the previously described embodiment. Assuming it has been rotated ninety degrees, the tool is then grasped by the handle 164 and oriented with respect to the animal to be stunned so that the trigger end 158 will contact the animal to actuate the tool at a location on its forehead such that the concussion knob 57 will strike the animal at a proper location. However, the tool may not be triggered until the operator squeezes on the safety lever 176, to pivot it in the direction of the arrow (FIG. 23), so as to move the rod 174 to its downward position as previously described. The projecting means 171 at the end of rod 174 is now out of engagement with the sear link portion 169, and the trigger member end 170 is now in operable association with the sear link end 168 so that the tool will be fired when the trigger end 158 is brought into contact with the animal. Safety lever 176 is then released to cause longitudinal re-positioning of the sear link 72 and movement of the end 170 of the trigger member out of association therewith, as aforesaid. The breech 34 is then opened by grasping and twisting bolt sleeve 38 to withdraw bolt member 35 and eject the cartridge, whereupon the tool is in condition for reloading to perform another stunning operation.

Thus an explosively actuated animal stunning tool has been described which achieves all of the objects of the invention.

What is claimed is:

1. An explosively actuated tool comprising: a barrel having a breech end and a muzzle end, barrel closure means including a cartridge receiving chamber at said breech end of the barrel, an apertured abutment member at said muzzle end of the barrel, a piston slidable within said barrel and including an abutment surface facing towards said muzzle end of the barrel, an elongated rigid member attached to said piston to project from said piston abutment surface towards and in alignment with the aperture of said apertured abutment member for passage therethrough, said elongated rigid member terminating in a tool instrumentality, buffer means comprising a stacked assembly of elastically deformable buffer rings of thick rubber-like material interleaved with rigid impact rings, said buffer means slidably interposed on said elongated rigid member between said piston abutment surface and said apertured abutment member, and means for firing a cartridge within said cartridge receiving chamber, whereby said buffer means substantially determines the length of stroke of said piston and elongated rigid member in response to the firing of such cartridge, and substantially instantaneously restores said piston and elongated rigid member to their initial positions upon completion of said stroke.

2. A tool according to claim 1, wherein the diameter of said buffer rings is substantially less than that of said barrel and wherein the diameter of said impact rings is but slightly less than that of said barrel and such as to cause said impact rings to slide along said barrel.

3. A tool according to claim 2, wherein at least one of said buffer rings has a diameter larger than other of said buffer rings.

4. A tool according to claim 2, wherein at least one of said buffer rings has elastic hardness characteristics differing from that of other of said buffer rings.

5. A tool according to claim 2, wherein brake lining material is sleeved around a plurality of said buffer rings, for radial expansion therewith into contact with said barrel.

6. A tool according to claim 1, wherein at least one of said elastically deformable buffer rings has peripherally chamfered oppositely disposed edge surfaces.

7. In an explosively actuated animal stunning tool having a barrel section, an attached receiver section mounting firing means of said tool, a trigger member connected to and disposed along a length of said barrel section on a side of said tool for axial linear movement in response to its actuation by contact with the animal to be stunned, and a handle extending outwardly of said tool on said side thereof between said firing means and said trigger member, the improvement comprising a sear link of said firing means mounted on said receiver section on said side of the tool for slidable movement between a pre-firing position and a tool triggered position thereof, an end portion of said sear link extending from the receiver side to the trigger member side of said handle and including guide means for positioning said sear link for operable association with said trigger member so that said trigger actuation movement causes tool actuating movement of the sear link, and safety means of said tool including projecting means movably associated with said handle and normally disposed in a safety position thereof between said guide means and said handle to prevent said movement of the sear link in response to said actuation of the trigger member and means to move said projecting means out of its said safety position to permit said movement of the sear link and into its said safety position, said projecting means and said guide means adapted for engagement during said movement of the projecting means into its said safety position to move said sear link from its said tool triggered position to its said pre-firing position.

8. In an explosively actuated animal stunning tool, the combination set forth in claim 7, wherein said end portion of the sear link extends around said handle to the opposite side thereof and is spaced away from said opposite side, said projecting means in said safety position projecting into the space between said sear link end portion and said handle.

9. An explosively actuated animal stunning tool comprising an enclosed barrel section having a cartridge chamber at one end and an aperture at the other end thereof, a receiver section attached to said end of the barrel section, firing means of said tool including a withdrawable bolt member slidably mounted within said receiver section for operable association with said cartridge chamber, a cylindrical sleeve portion of said bolt member for grasping to withdraw said bolt member from said association with the cartridge chamber and normally surrounding said receiver section when the bolt member is operably associated with said cartridge chamber, a trigger mechanism of said tool including a sear link mounted for longitudinal movement on one side of said receiver section and a hand pressure operated trigger lever disposed along said barrel section on the side thereof opposite said side of the receiver section, said trigger lever pivotally connected at a location along its length near an end thereof to pivot connection means of said tool for movement toward said barrel section and having a receiver-surrounding portion extending from said end thereof and means connecting said portion and said sear link whereby said movement of the trigger level actuates said firing means of the tool, a piston within said barrel section to be impelled toward said other end thereof in response to explosion of a cartridge positioned within said cartridge chamber, a stunning instrument attached to said piston extending therefrom towards said other end of the barrel section for linear movement through said aperture thereat responsive to said movement of the piston, and a buffer system within said barrel section extending substantially the length thereof in operable association with said piston and stunning instrument, said buffer system comprising elastic material which is elastically deformable under compression force imparted thereto by said impelled movement of the piston to determine the length of stroke of said stunning instrument and to substantially instantaneously restore said stunning instrument to its initial position within said barrel section upon completion of said stroke.

10. An explosively actuated animal stunning tool comprising an enclosed barrel section having a cartridge chamber at one end and an aperture at the other end thereof, a receiver section attached to said end of the barrel section, firing means of said tool including a withdrawable bolt member slidably mounted within said receiver section for operable association with said cartridge chamber, a cylindrical sleeve portion of said bolt member for grasping to withdraw said bolt member from said association with the cartridge chamber and normally surrounding said receiver section when the bolt member is operably associated with said cartridge chamber, a trigger member connected to and disposed along a length of said barrel section on a side of said tool for axial linear movement in response to its actuation by contact with the animal to be stunned, a handle extending outwardly of said tool on said side thereof between said firing means and said trigger member, a sear link of said firing means mounted for longitudinal movement on said receiver section on said side of the tool, an end portion of said sear link extending from the receiver side to the trigger member side of said handle and normally positioned toward said trigger member for operable association therewith so that said trigger actuation movement causes tool actuating movement of the sear link, safety means of said tool including projecting means movably associated with said handle and normally disposed in a safety position thereof to prevent said movement of the sear link in response to said actuation of the trigger member and means to move said projecting means out of its said safety position to permit said movement of the sear link, a piston within said barrel section to be impelled toward said other end thereof in response to explosion of a cartridge positioned within said cartridge chamber, a stunning instrument attached to said piston extending therefrom towards said other end of the barrel section for linear movement through said aperture thereat responsive to said movement of the piston, and a buffer system within said barrel section extending substantially the length thereof in operable association with said piston and stunning instrument, said buffer system comprising elastic material which is elastically deformable under compression force imparted thereto by said impelled movement of the piston to determine the length of stroke of said stunning instrument and to substantially instantaneously restore said stunnning instrument to its initial position within said barrel section upon completion of said stroke.

11. An explosively actuated tool comprising an enclosed barrel section having a cartridge chamber at one end and an aperture at the other end thereof, a receiver section attached to said one end of the barrel section, firing means of said tool including a withdrawable bolt member slidably mounted within said receiver section for operable association with said cartridge chamber, a cylindrical sleeve portion of said bolt member for grasping to withdraw said bolt member from said association with the cartridge chamber, a trigger mechanism of said tool including a sear link operably engaging said firing means and a hand pressure operated trigger lever extending along one side of said tool and operably engaging said sear link, a piston displaceable within said barrel, said piston including a breech end abutment surface, a piston rod extending from said piston in axial alignment with the aperture of said barrel for passage therethrough and terminating in a tool instrumentality, and buffer means comprising a plurality of thick elastically deformable buffer rings spaced by substantially rigid impact rings slidably interposed on said rod and extending effectively the length of said barrel between said barrel aperture and said piston abutment surface members.

References Cited in the file of this patent

UNITED STATES PATENTS

| | | |
|---|---|---|
| 2,804,391 | Brooks et al. | Oct. 15, 1957 |
| 2,922,185 | Aitken et al. | Jan. 26, 1960 |

FOREIGN PATENTS

| | | |
|---|---|---|
| 163,526 | Switzerland | Oct. 16, 1933 |
| 329,947 | Italy | Sept. 28, 1935 |
| 80,271 | Denmark | Dec. 12, 1955 |